Patented Nov. 13, 1951

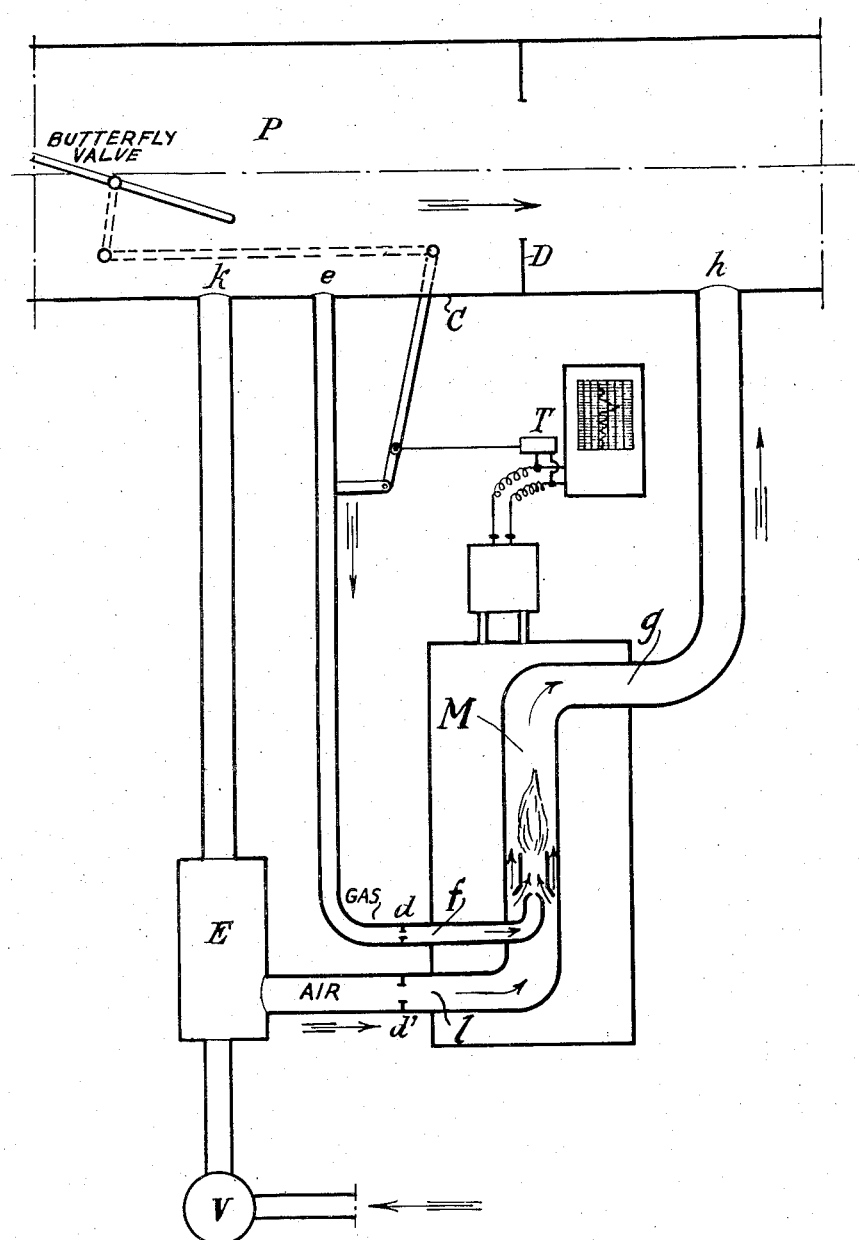

2,574,665

UNITED STATES PATENT OFFICE 2,574,665

APPARATUS FOR DETECTING THE CALORIC OUTPUTS OF GASEOUS FUELS

Pierre Schuller, Decazeville, France, assignor to Societe Anonyme de Commentry-Fourchambault & Decazeville, Paris, France, a company of France Application August 16, 1948, Serial No. 44,446
In France August 20, 1947

2 Claims. (Cl. 73—190)

In numerous industries that use gas as a fuel, the problem of measuring and regulating the calorific output arises in order to obtain regularity of heating and maximum heat efficiency.

Usually, this measurement is effected by calculating the output and the calorific value of the gas.

The problem is a simple one when the gas has constant characteristics: pressure, temperature, moisture, composition, calorific value.

In general, all these characteristics are variable; it is thus necessary to calculate the specific weight in order to calculate the outputs which are involved in the measurement of the output of the gas and in the measurement of the quantity of gas admitted into the calorimeter.

The calorific output is calculated from the output reduced to normal conditions and from the calorific value taking into account the specific weight.

In this case the measuring equipment comprises numerous instruments: supply-meter, calorimeter, densimeter, thermometer, pressure-gauge, barometer and, in general, does not directly supply the calorific output, which has to be calculated.

The present invention has for its object to provide an apparatus giving directly the calorific output, by direct reading on a single instrument, thus reducing the number of measurements and in particular avoiding the measurement of the specific weight, which is not reliable.

In a supply-meter comprising a gas pipe in which the uncorrected output is measured by the pressure drop in a restricted passage or any other device producing a pressure drop, the output $Q$ of the gas is given by the formula:

$$Q = KS\sqrt{\frac{H}{\delta}}$$

wherein:
$K$ is a coefficient pertaining to the instrument
$S$ is the area of the restricted passage
$H$ is the pressure drop
$\delta$ is the specific weight of the gas.

A calorimeter of a usual type may be used, such as a Junkers calorimeter or any other instrument, and fed with a constant supply of water by any method usually used for obtaining such constancy.

But contrary to custom, said calorimeter is not supplied with a constant flow of gas. It is only supplied under conditions of pressure difference between opposite sides of the restricted passage, said conditions being determined as follows (characteristics of the calorimeter):

$ks$, characteristics of the restricted passage of the calorimeter
$\delta$, specific weight of the gas at the gas supply, said supply being such that the characteristics of the gas before the restricted passage of the calorimeter are the same as those before the supply-meter; $\delta$ is therefore of the same value in both cases
$h$, difference of pressure between the near side and the far side of the restricted passage
$A$, constant water supply
$\Delta T$, difference between the temperatures of the water of the calorimeter at the inlet and at the outlet
$C$, calorific value of the gas
$q$, supply of gas to the calorimeter, the value of which is $$q = ks\sqrt{\frac{h}{\delta}}$$

The calorific value is expressed by:

$$C = \frac{A.\Delta T}{q} = \frac{A.\Delta T}{ks\sqrt{\frac{h}{\delta}}}$$

The calorific output is therefore:

$$QC = KS\sqrt{\frac{H}{\delta}} \cdot \frac{A.\Delta T}{ks\sqrt{\frac{h}{\delta}}} = \frac{KS}{ks}.A.\Delta T\sqrt{\frac{H}{h}}$$

Now $$\frac{KS}{ks}.A$$

is a constant which will be called $K_1$, hence the calorific output can be expressed as $$QC = K_1.\Delta T\sqrt{\frac{H}{h}}$$

The apparatus of the present invention is based on this equation which pertains to the arrangement used and in which the specific weight of the gas is eliminated.

The difference between the upstream and downstream pressures of the restricted passage of the calorimeter is adjusted so that it is constantly equal to the pressure drop of the supply-meter, so that $h = H$ and the calorific output is $K_1\Delta T$.

The calorific output is therefore directly given by reading the instrument that measures the difference between temperatures of the water flowing into and issuing from the calorimeter.

The single figure of the accompanying drawing, which is given by way of a non-limitative example, shows diagrammatically an apparatus according to the invention.

In the drawing, C is the gas pipe and D its restricted passage. The calorimeter M is connected to the pipe C on opposite sides of the restricted passage D by means of pipes ef and gh before and after said passage. In the pipe ef is mounted the restricted passage d of the calorimeter.

It can be seen that under these conditions the calorimeter operates at the pressure p of the gas in the pipe. It is therefore necessary for the combustion air to be blown by a fan V, and the problem arises of regulating the air supply proportionally to the supply of gas burned in the calorimeter, so that the excess of air is substantially constant and the thermic efficiency of the calorimeter is not altered, otherwise an error would be introduced into the readings of the calorimeter.

For this purpose, the following contrivance is used.

A pipe kl is connected before the restricted passage D and to the calorimeter; in said pipe is provided a restricted passage. The fan V blows the combustion air through the pipe kl or better, through a pressure regulating chamber E located before d'. The supply of air is slightly greater than the maximum supply required to provide satisfactory combustion when the supply of gas is at its maximum. The restricted passage d' introduces into the air supply a pressure difference equal to H and identical to that which acts on the gas supply. The supplies of air and gas are therefore proportional whatever the supply of gas to the calorimeter. The excess of air blown in flows into the gas supply pipe C through the pipe Ek. In most cases this air is not objectionable, since its supply is small as compared with the supply of the gas pipe C: the same moreover applies to the smoke which escapes from the calorimeter and flows into the pipe C after the restricted passage D.

The igniting of the burner mounted in the calorimeter may be effected by any method, viz. external ignition, internal ignition by means of a hot wire plug, spark, etc.

The drawing furthermore shows diagrammatically at T an instrument of known type which registers the temperatures of the water at the inlet and at the outlet of the colorimeter.

The apparatus just described for measuring calorific outputs, provides for a solution of the problem of regulating the calorific output; in order to render the calorific output QC constant, it is in fact necessary to keep ΔT constant by acting on the gas supply in the pipe C.

The figure shows diagrammatically how the gaseous flow through the pipe P can be controlled in accordance with the instantaneous calorific value of the gas. A butterfly valve fitted up in the gas pipe P is actuated, through an adequate linkage, from the instrument T which is responsive to the calorific output.

What I claim is:

1. Apparatus for detecting and regulating the calorific outputs of gaseous fuel circulating in a main pipe, which comprises a calorimeter, means for producing a drop of pressure in a part of said main pipe, means for connecting the calorimeter with said pipe ahead of said part, means for burning in said calorimeter the flow of gaseous fuel which is conveyed to said calorimeter by said connecting means, means in the circuit comprising said connecting means and said calorimeter for producing a pressure drop in the flow of gaseous fuel conveyed to the said calorimeter, said last named means being adapted to give a pressure drop equal to said first named one, piping means for introducing gas under pressure containing oxygen into said calorimeter for burning the gaseous fuel crossing said calorimeter, means on said piping means for producing in the flow of gas containing oxygen a pressure drop equal to the first named one, a discharge pipe ahead of the said last named means for evacuating the excess of said gas containing oxygen, valve means on said main pipe for regulating the output of gaseous fuel passing through said pipe, and means responsive to the variations of temperature in said calorimeter for operating said valve means.

2. An apparatus for detecting the calorific outputs of gaseous fuel circulating in a main pipe, which comprises a calorimeter, means for producing a drop of pressure in a part of said main pipe, means for connecting the calorimeter with said pipe ahead of said part, means for burning in said calorimeter the flow of gaseous fuel which is conveyed to said calorimeter by said connecting means, means in the circuit comprising said connecting means and said calorimeter for producing a pressure drop in the flow of gaseous fuel conveyed to said calorimeter, said last named means being adapted to give a pressure drop equal to said first named one, piping means for introducing gas under pressure containing oxygen into said calorimeter for burning the gaseous fuel crossing said calorimeter, means on said piping means for producing in the flow of gas containing oxygen a pressure drop equal to the first named one, and a discharge pipe ahead of the said last named means for evacuating the excess of said gas containing oxygen.

PIERRE SCHULLER.

REFERENCES CITED

The following references are of record in the file of this patent:

UNITED STATES PATENTS

| Number | Name | Date |
|---|---|---|
| 2,067,645 | Pinkerton | Jan. 12, 1937 |
| 2,349,521 | Schmidt | May 23, 1944 |

FOREIGN PATENTS

| Number | Country | Date |
|---|---|---|
| 104,666 | Sweden | June 2, 1942 |
| 637,338 | Germany | Oct. 26, 1936 |